US005685488A

United States Patent [19]

Gwartney

[11] Patent Number: 5,685,488
[45] Date of Patent: Nov. 11, 1997

[54] GARDEN WATERING SYSTEM

[76] Inventor: Evelyn E. Gwartney, 6316 Wendover Ct.,, Fredericksburg, Va. 22407

[21] Appl. No.: 393,657

[22] Filed: Feb. 24, 1995

[51] Int. Cl.[6] .................................................. B05B 15/06
[52] U.S. Cl. ........................ 239/279; 239/543; 239/545; 47/48.5; 47/79
[58] Field of Search .................................... 239/273, 275, 239/279, 543, 545, 266, 268, 269, 450; 47/27, 31, 33, 48.5 M, 79

[56] References Cited

U.S. PATENT DOCUMENTS

| | | | |
|---|---|---|---|
| 648,263 | 4/1900 | Hull | 239/268 |
| 1,914,850 | 6/1933 | Foster | 239/269 |
| 2,568,515 | 9/1951 | Scheiwer | 239/450 X |
| 2,771,320 | 11/1956 | Korwin | 239/279 |
| 2,909,328 | 10/1959 | Babyak | 239/268 |
| 3,387,786 | 6/1968 | Rynberk | 239/268 X |
| 3,933,311 | 1/1976 | Lemelson | 47/33 X |
| 4,087,049 | 5/1978 | Traina | 239/276 X |
| 4,562,963 | 1/1986 | Butler | 239/266 X |
| 5,172,515 | 12/1992 | Lapshansky, Sr. et al. | 239/276 X |
| 5,272,835 | 12/1993 | Stern | 47/79 |

Primary Examiner—Kevin P. Shaver
Assistant Examiner—Steven J. Ganey
Attorney, Agent, or Firm—Oliff & Berridge

[57] ABSTRACT

A system for surrounding and watering garden plants. The inventive device includes a guarded spray assembly having a perimeter conduit for positioning about a plant. A water inlet permits coupling of the perimeter conduit to a water supply line, whereby pressurized water is sprayed through dispensing apertures onto the surrounded plant. A plurality of water outlets are mounted about the perimeter conduit and permit fluid coupling of a plurality of the guarded spray assemblies together.

9 Claims, 4 Drawing Sheets

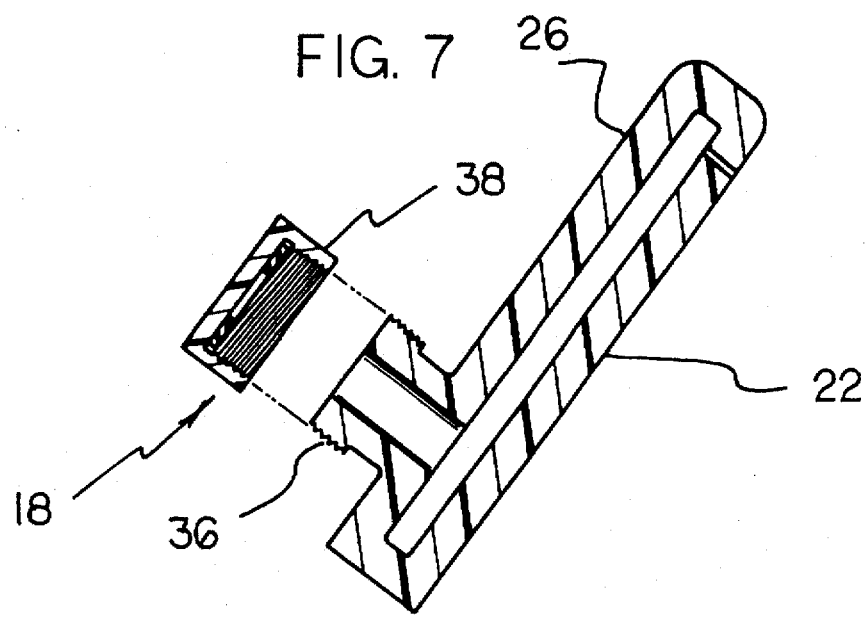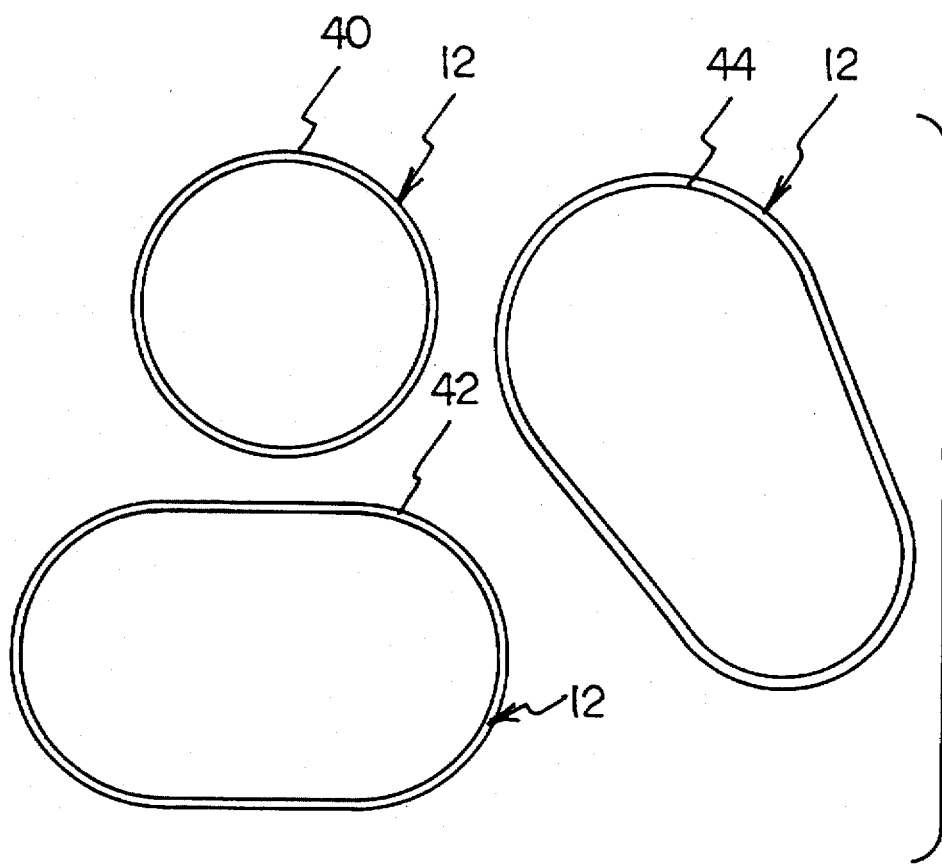

GARDEN WATERING SYSTEM

BACKGROUND OF THE INVENTION

1. Field of the Invention

The present invention relates to fluid distributing devices and more particularly pertains to a garden watering system for surrounding and watering garden plants.

2. Description of the Prior Art

The use of fluid distributing devices is known in the prior art. More specifically, fluid distributing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art fluid distributing devices include U.S. Pat. No. 5,232,159; U.S. Pat. No. 5,168,678; U.S. Pat. No. 4,420,902; U.S. Pat. No. 4,212,134; and U.S. Design Pat. No. 257,064.

While these devices fulfill their respective, particular objectives and requirements, the aforementioned patents do not disclose a garden watering system for surrounding and watering garden plants which includes a guarded spray assembly having a perimeter conduit for positioning about a plant, a water inlet permitting coupling of the perimeter conduit to a water supply line such that pressurized water is sprayed through dispensing apertures onto the surrounded plant, and a plurality of water outlets mounted about the perimeter conduit for permitting fluid coupling of a plurality of the guarded spray assemblies together.

In these respects, the garden watering system according to the present invention substantially departs from the conventional concepts and designs of the prior art, and in so doing provides an apparatus primarily developed for the purpose of surrounding and watering garden plants.

SUMMARY OF THE INVENTION

In view of the foregoing disadvantages inherent in the known types of fluid distributing devices now present in the prior art, the present invention provides a new garden watering system construction wherein the same can be utilized for surrounding and watering garden plants. As such, the general purpose of the present invention, which will be described subsequently in greater detail, is to provide a new garden watering system apparatus and method which has many of the advantages of the fluid distributing devices mentioned heretofore and many novel features that result in a new garden watering system which is not anticipated, rendered obvious, suggested, or even implied by any of the prior art fluid distributing devices, either alone or in any combination thereof.

To attain this, the present invention generally comprises a system for surrounding and watering garden plants. The inventive device includes a guarded spray assembly having a perimeter conduit for positioning about a plant. A water inlet permits coupling of the perimeter conduit to a water supply line, whereby pressurized water is sprayed through dispensing apertures onto the surrounded plant. A plurality of water outlets are mounted about the perimeter conduit and permit fluid coupling of a plurality of the guarded spray assemblies together.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new garden watering system apparatus and method which has many of the advantages of the fluid distributing devices mentioned heretofore and many novel features that result in a garden watering system which is not anticipated, rendered obvious, suggested, or even implied by any of the prior art fluid distributing devices, either alone or in any combination thereof.

It is another object of the present invention to provide a new garden watering system which may be easily and efficiently manufactured and marketed.

It is a further object of the present invention to provide a new garden watering system which is of a durable and reliable construction.

An even further object of the present invention is to provide a new garden watering system which is susceptible of a low cost of manufacture with regard to both materials and labor, and which accordingly is then susceptible of low prices of sale to the consuming public, thereby making such garden watering systems economically available to the buying public.

Still yet another object of the present invention is to provide a new garden watering system which provides in the apparatuses and methods of the prior art some of the advantages thereof, while simultaneously overcoming some of the disadvantages normally associated therewith.

Still another object of the present invention is to provide a new garden watering system for surrounding and watering garden plants.

Yet another object of the present invention is to provide a new garden watering system which includes a guarded spray assembly having a perimeter conduit for positioning about a plant, a water inlet permitting coupling of the perimeter conduit to a water supply line such that pressurized water is sprayed through dispensing apertures onto the surrounded plant, and a plurality of water outlets mounted about the perimeter conduit for permitting fluid coupling of a plurality of the guarded spray assemblies together.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a cross sectional view taken along line 7—7 of FIG. 3.

FIG. 8 is a top plan view of a plurality of guarded spray means illustrating disparate possible shapes thereof in construction of the present invention 10.

DESCRIPTION OF THE PREFERRED EMBODIMENT

Figure 1:
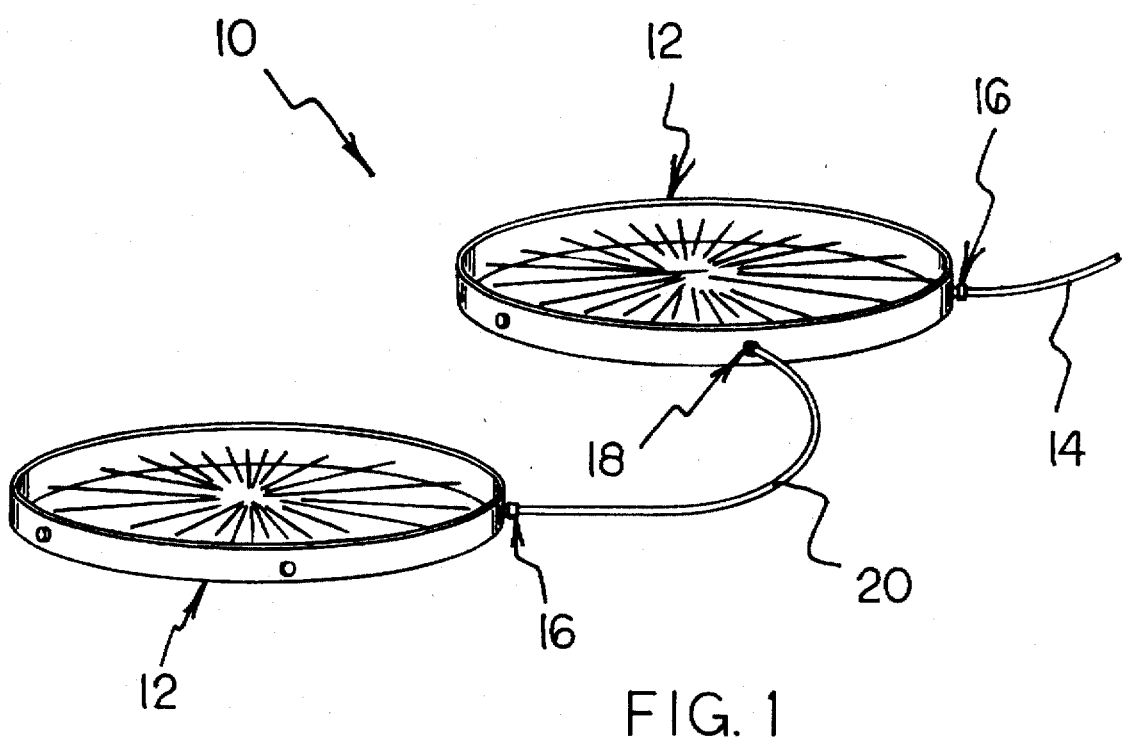
FIG. 1 is an isometric illustration of a garden watering system according to the present invention in use.
Figure 2:
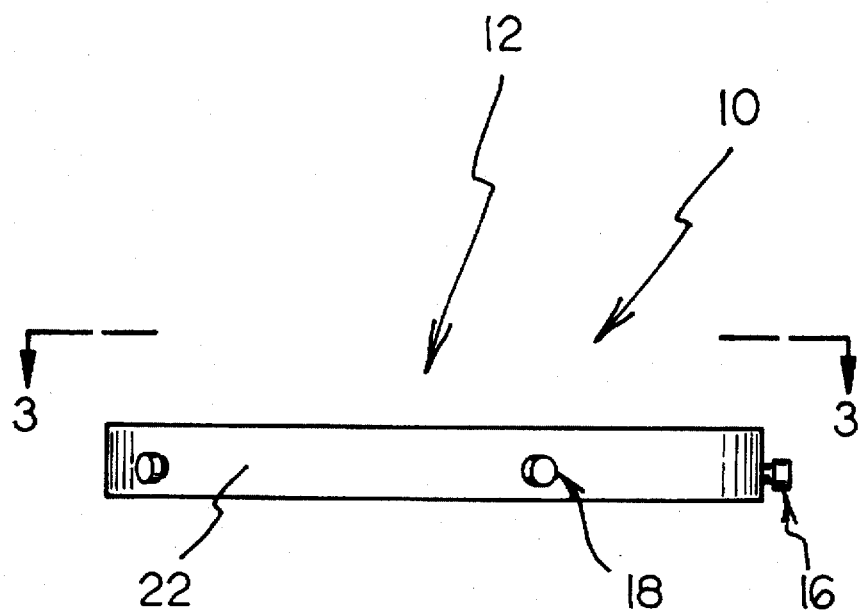
FIG. 2 is an elevation view of the invention, per se.
Figure 3:
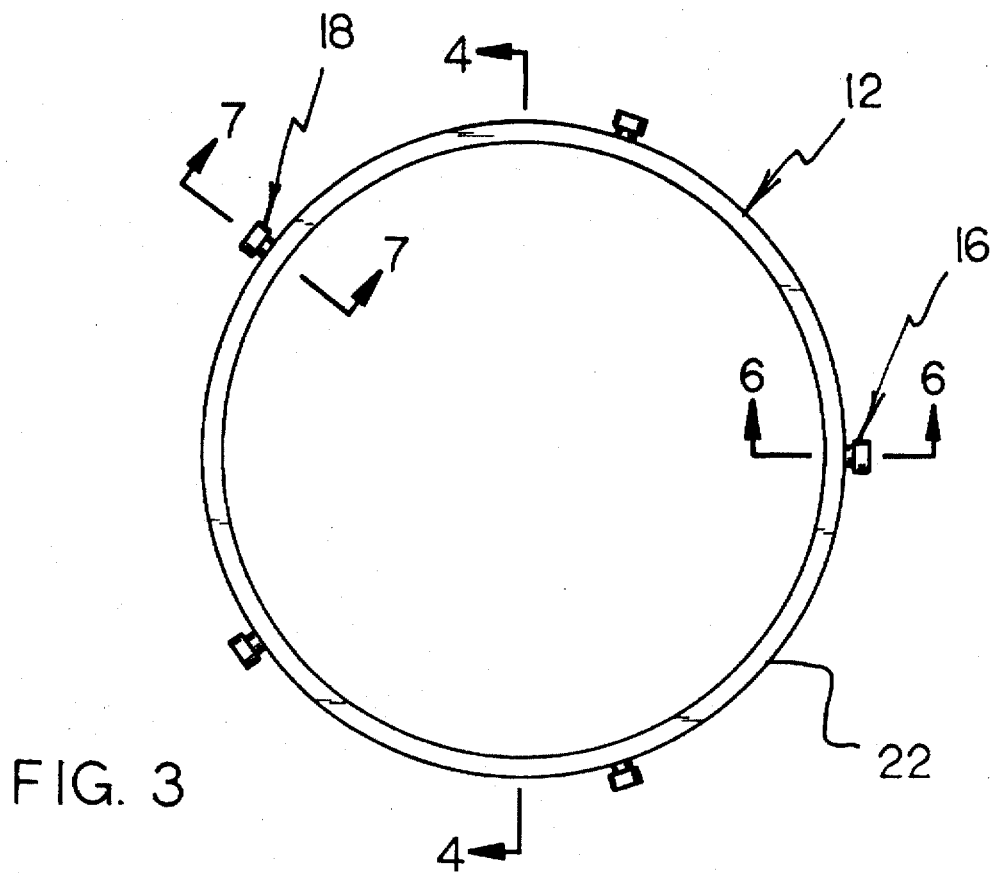
FIG. 3 is a top plan view thereof.
Figure 4:
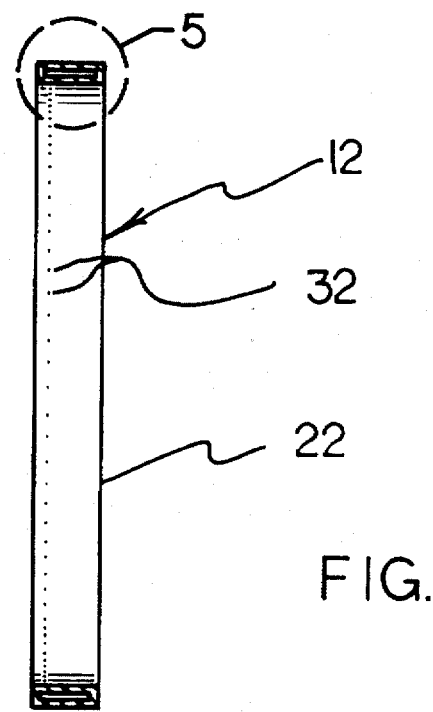
FIG. 4 is a cross sectional view taken along line 4—4 of FIG. 3.

With reference now to the drawings, and in particular to FIGS. 1–8 thereof, a new garden watering system embodying the principles and concepts of the present invention and generally designated by the reference numeral 10 will be described.

More specifically, it will be noted that the garden watering system 10 comprises a guarded spray means 12 for positioning circumferentially about an unillustrated area of ground and a plant situated and growing from such ground for dispensing water from a water supply line 14 onto the plant and surrounding ground. A water inlet means 16 is mounted to the guarded spray means 12 for coupling the guarded spray means to a water supply line 14 as illustrated in FIG. 1 of the drawings. A water outlet means 18 is mounted to the guarded spray means 12 for coupling to a coupling hose 20 which can optionally be utilized to couple to the water inlet means 16 of another guarded spray means 12, whereby a plurality of remotely positioned plants can be watered.

Figure 5:
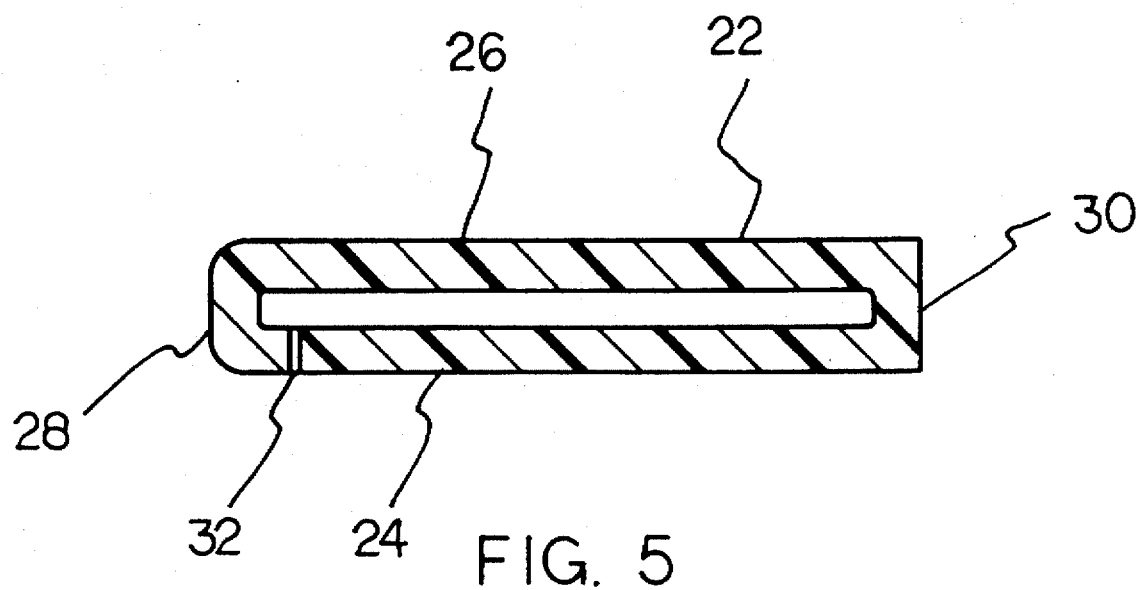
FIG. 5 is an enlarged cross sectional view of the area set forth in FIG. 4.

Referring now to FIGS. 2 through 5, it can be shown that the guarded spray means 12 according to the present invention 10 preferably comprises a perimeter conduit 22 of continuous construction. The perimeter conduit, as shown in FIG. 5, is defined by an inner wall 24 spaced from and parallel to an outer wall 26, with an upper wall 28 and a lower wall 30 extending between the inner and outer walls so as to couple the same together in the spaced and parallel orientation and to define an interior spaced through which water or other fluids can flow through the perimeter conduit 22. A plurality of dispensing apertures 32 are directed through the inner wall 24 and into communication with an interior of the perimeter conduit 22 such that a pressurized injection of water into the interior of the perimeter conduit will result in a dispensing of such water through the dispensing apertures 32 towards a center of the perimeter conduit 22, as shown in FIG. 1 of the drawings.

Figure 6:
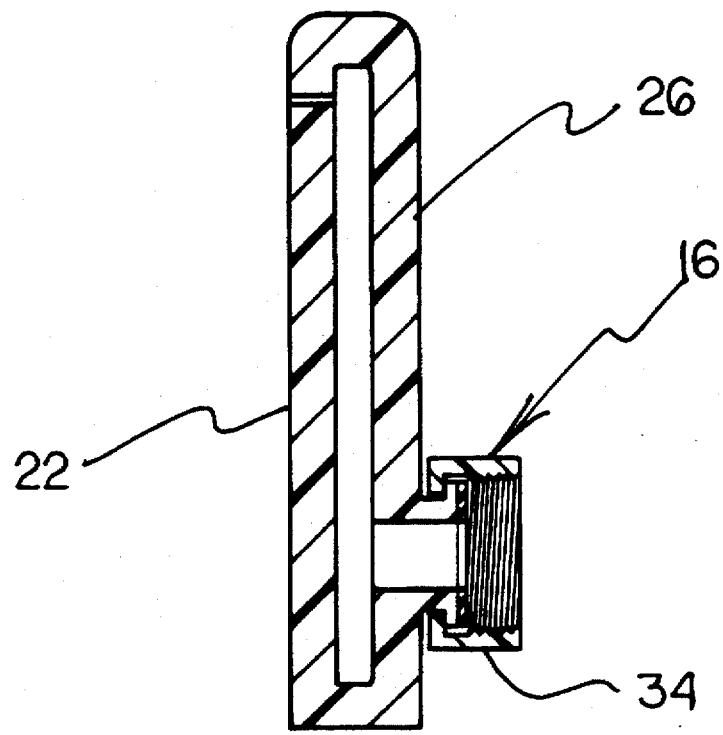
FIG. 6 is a cross sectional view taken along line 6—6 of FIG. 3.

As shown in FIG. 6, the water inlet means 16 according to the present invention 10 preferably comprises an interior threaded fitting 34 mounted to the outer wall 26 of the perimeter conduit 22 and into fluid communication with an interior thereof for permitting threaded coupling with a water supply line 14 such as a garden hose or the like to permit a pressurized injection of water into the perimeter conduit 22. Similarly and as shown in FIG. 7, the water outlet means 18 according to the present invention 10 preferably comprises an exterior threaded fitting 34 mounted to the outer wall 26 of the perimeter conduit 22 and into fluid communication with the interior thereof. A closed cap 38 is normally mounted to the exterior threaded fitting 36 so as to preclude fluid communication therethrough. By this structure, the closed cap 38 can be selectively removed from the exterior threaded fitting 36 to permit the joining of a coupling hose 20 to the water outlet means, whereby such coupling hose 20 can be engaged to the water inlet means 16 of another guarded spray means 12 as shown in FIG. 1 of the drawings.

Referring now to FIG. 8, it can be shown that the perimeter conduit 22 of the guarded spray means 12 is preferably shaped so as to define a circle 40. Alternatively, the perimeter conduit 22 may be shaped so as to define an oval 42 or an oblong oval 44. Further alternative shapes of the perimeter conduit 22 include squares, rectangles, or any other polygonal shape defining a closed loop. It should be further noted that the perimeter conduit 22 need not be continuous or closed in configuration, but yet may be separated along a portion thereof so as to permit lateral positioning of the guarded spray means 12 about a growing plant.

In use, the garden watering system 10 according to the present invention can be easily utilized to effect dispensing of water radially about a plant and the surrounding soil. The present invention 10 can be utilized in a plurality of guarded spray means 12, connected in series or otherwise so as to permit simultaneous watering of a plurality of remote plants. If desired, additional plants can be planted around the invention so as to disguise the same. The present invention may also be constructed of a substantially deformable material and utilized in combination with ground-piercing stakes which extend over an upper edge of the perimeter conduit 22 so as to permit custom forming of the perimeter conduit to a desired shape.

As to a further discussion of the manner of usage and operation of the present invention, the same should be apparent from the above description. Accordingly, no further discussion relating to the manner of usage and operation will be provided.

with respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A watering system comprising: comprising:

spray means for positioning about a watering area and for dispensing water from a water supply line onto the watering area;

water inlet means mounted to the spray means for coupling the spray means to a water supply line;

a plurality of sealable water outlet means mounted to the spray means, adapted for coupling to a coupling conduit which can be coupled to water inlet means in communication with another spray means, for chain connectability of the garden watering system, and wherein the spray means comprises a perimeter conduit of continuous construction, the perimeter conduit including an inner wall, an outer wall spaced from the inner wall, and spaced upper and lower walls extending between the inner and outer walls so as to couple the same together in a spaced orientation and to define an interior space through which water can flow through the perimeter conduit, the inner wall being shaped so as to define a plurality of dispensing apertures directed through the inner wall and into communication with an interior of the perimeter conduit such that an injection of water into the interior of the perimeter conduit results in a dispensing of the water through the dispensing apertures towards a center of the perimeter conduit.

2. The watering system of claim 1, wherein the water inlet means comprises an interior threaded fitting mounted to the outer wall of the perimeter conduit and positioned in fluid communication with an interior thereof for permitting threaded coupling with a coupling conduit for water supply.

3. The watering system of claim 2, wherein each of plurality of the water outlet means comprises an exterior threaded fitting mounted to the outer wall of the perimeter conduit and in fluid communication with the interior thereof and a closed cap mounted to the exterior threaded fitting so as to preclude fluid communication therethrough, whereby the closed cap can be selectively removed from the exterior threaded fitting to permit a joining of a coupling conduit to one of the plurality a water outlet means.

4. The watering system of claim 3, wherein the perimeter conduit is shaped so as to define a circle.

5. The watering system of claim 3, wherein the perimeter conduit is shaped so as to define an oval.

6. The watering system of claim 3, wherein the perimeter conduit is shaped so as to define an oblong oval.

7. A watering system comprising:

a first spray means for positioning about a watering area and for dispensing water from a water supply line onto the watering area;

a first water inlet means mounted to the first spray means for coupling the first spray means to the water supply line;

a coupling conduit;

a plurality of water outlet means mounted to the first spray means for coupling to the coupling conduit;

a second spray means for positioning about a second watering area and for dispensing water from the water supply line onto the second watering area;

a second water inlet means mounted to the second spray means for coupling the second spray means to the coupling conduit, chain connecting the second spray means to the first spray means; and wherein the first and second spray means each comprise a perimeter conduit of continuous construction, the perimeter conduit including an inner wall, an outer wall spaced from the inner wall, and spaced upper and lower walls extending between the inner and outer walls so as to couple the same together in a spaced orientation and to define an interior space through which water can flow through the perimeter conduit, the inner wall being shaped so as to define a plurality of dispensing apertures directed through the inner wall and into communication with an interior of the perimeter of the perimeter conduit results in a dispensing of the water through the dispensing aperture towards a center of the perimeter conduit.

8. The watering system of claim 7, wherein the water inlet means each comprise an interior threaded fitting mounted to the outer wall of the respective perimeter conduit and positioned into fluid communication with an interior thereof.

9. The watering system of claim 8, wherein each of the plurality of water outlet means comprise:

an exterior threaded fitting mounted to the outer wall of the respective perimeter conduit and into fluid communication with the interior thereof; and a closed cap mounted to the exterior threaded fitting so as to preclude fluid communication therethrough, whereby the closed cap can be selectively removed from the exterior threaded fitting to permit a joining of a coupling conduit to one of the plurality of water outlet means.

* * * * *